(12) United States Patent
Bian et al.

(10) Patent No.: US 11,320,590 B2
(45) Date of Patent: May 3, 2022

(54) POLARIZERS BASED ON LOOPED WAVEGUIDE CROSSINGS

(71) Applicants: GLOBALFOUNDRIES U.S. Inc., Santa Clara, CA (US); KHALIFA UNIVERSITY OF SCIENCE AND TECHNOLOGY, Abu Dhabi (AE)

(72) Inventors: Yusheng Bian, Ballston Lake, NY (US); Sujith Chandran, Abu Dhabi (AE); Jaime Viegas, Abu Dhabi (AE); Humarira Zafar, Abu Dhabi (AE); Ajey Poovannummoottil Jacob, Watervliet, NY (US)

(73) Assignees: GlobalFoundries U.S. Inc., Santa Clara, CA (US); Khalifa University of Science and Technology, Abu Dhabi (AE)

( * ) Notice: Subject to any disclaimer, the term of this patent is extended or adjusted under 35 U.S.C. 154(b) by 39 days.

(21) Appl. No.: 16/836,047

(22) Filed: Mar. 31, 2020

(65) Prior Publication Data
US 2021/0302651 A1 Sep. 30, 2021

(51) Int. Cl.
| G02B 6/26 | (2006.01) |
| G02B 6/125 | (2006.01) |
| G02B 6/126 | (2006.01) |
| G02B 6/13 | (2006.01) |
| G02B 6/12 | (2006.01) |

(52) U.S. Cl.
CPC ............. *G02B 6/125* (2013.01); *G02B 6/126* (2013.01); *G02B 6/13* (2013.01); *G02B 2006/12147* (2013.01)

(58) Field of Classification Search
CPC .......... G02B 6/125; G02B 6/13; G02B 6/126; G02B 2006/12147; G02B 6/26
See application file for complete search history.

(56) References Cited

U.S. PATENT DOCUMENTS

| 6,999,645 B2 * | 2/2006 | Gao | G02B 6/1228 385/129 |
| 2009/0142019 A1 * | 6/2009 | Popovic | G02B 6/10 385/28 |
| 2014/0325827 A1 * | 11/2014 | Lipson | G02B 6/125 29/592 |
| 2018/0143378 A1 * | 5/2018 | Meister | G02B 6/4214 |
| 2018/0173024 A1 * | 6/2018 | McGreer | G02F 1/2257 |

OTHER PUBLICATIONS

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019.

(Continued)

*Primary Examiner* — Jennifer Doan
(74) *Attorney, Agent, or Firm* — Thompson Hine LLP; Anthony Canale

(57) ABSTRACT

Structures for a polarizer and methods of fabricating a structure for a polarizer. A waveguide crossing includes a first arm and a second arm. A waveguide loop couples the first arm of the waveguide crossing to the second arm of the waveguide crossing. The waveguide crossing and the waveguide loop provide a structure for the polarizer.

20 Claims, 7 Drawing Sheets

(56) References Cited

OTHER PUBLICATIONS

Rakowski, et al., "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H .3.

H. Zafar, A. Khilo, and M. S. Dahlem, "Compact silicon TE-pass polarizer using rib waveguide adiabatic bends with side gratings," in OSA Advanced Photonics Congress (AP) 2019 (IPR, Networks, NOMA, SPPCom, PVLED), OSA Technical Digest (Optical Society of America, 2019), paper ITh3C.2.

Daoxin Dai, Zhi Wang, Nick Julian, and John E. Bowers, "Compact broadband polarizer based on shallowly-etched silicon-on-insulator ridge optical waveguides," Opt. Express 18, 27404-27415 (2010).

B. Paredes, H. Zafar, M. S. Dahlem and A. Khilo, "Silicon photonic TE polarizer using adiabatic waveguide bends," 2016 21st OptoElectronics and Communications Conference (OECC) held jointly with 2016 International Conference an Photonics in Switching (PS), Niigata, 2016, pp. 1-3.

Humaira Zafar, Paulo Moreira, Ayat M. Taha, Bruna Paredes, Marcus S. Dahlem, and Anatol Khilo, "Compact silicon TE-pass polarizer using adiabatically-bent fully-etched waveguides," Opt. Express 26, 31850-31860 (2018).

M. Z. Alam, J. Stewart Aitchison, and M. Mojahedi, "Compact and silicon-on-insulator-compatible hybrid plasmonic TE-pass polarizer," Opt. Lett. 37, 55-57 (2012).

J. F. Bauters, M. J. R. Heck, D. Dai, J. S. Barton, D. J. Blumenthal and J. E. Bowers, "Ultralow-Loss Planar Si3N4 Waveguide Polarizers," in IEEE Photonics Journal, vol. 5, No. 1, pp. 6600207-6600207, Feb. 2013.

Bian et al., "Hybrid vanadate waveguiding configurations for extreme optical confinement and efficient polarization management in the near-infrared", Nanoscale, 2018,10, 16667-16674.

J. F. Bauters, M. J. R. Heck, D. Dai, D. D. John, J. S. Barton, D. J. Blumenthal, and J. E. Bowers, "High Extinction, Broadband, and Low Loss Planar Waveguide Polarizers," in Advanced Photonics Congress, OSA Technical Digest (online) (Optical Society of America, 2012), paper ITu2B.2.

\* cited by examiner

POLARIZERS BASED ON LOOPED WAVEGUIDE CROSSINGS

BACKGROUND

The present invention relates to photonics chips and, more specifically, to structures for a polarizer and methods of fabricating a structure for a polarizer.

Photonics chips are used in many applications and systems including, but not limited to, data communication systems and data computation systems. A photonics chip integrates optical components, such as waveguides, optical switches, and directional couplers, and electronic components, such as field-effect transistors, into a unified platform. Among other factors, layout area, cost, and operational overhead may be reduced by the integration of both types of components on the same chip.

Polarizers are a type of optical component commonly found in photonics chips. A polarizer is configured to receive light containing multiple modes (e.g., transverse electric (TE) mode and transverse magnetic (TM) mode) and to allow only one of these modes to propagate while the other of the modes is eliminated or dropped. Polarizers that pass only TE mode have rather large footprints that consume significant layout area on the photonics chip.

Improved structures for a polarizer and methods of fabricating a structure for a polarizer are needed.

SUMMARY

In an embodiment of the invention, a structure includes a waveguide crossing including a first arm and a second arm, and a waveguide loop coupling the first arm of the waveguide crossing to the second arm of the waveguide crossing.

In an embodiment of the invention, a method includes forming a waveguide crossing including a first arm and a second arm, and forming a waveguide loop coupling the first arm of the waveguide crossing to the second arm of the waveguide crossing.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
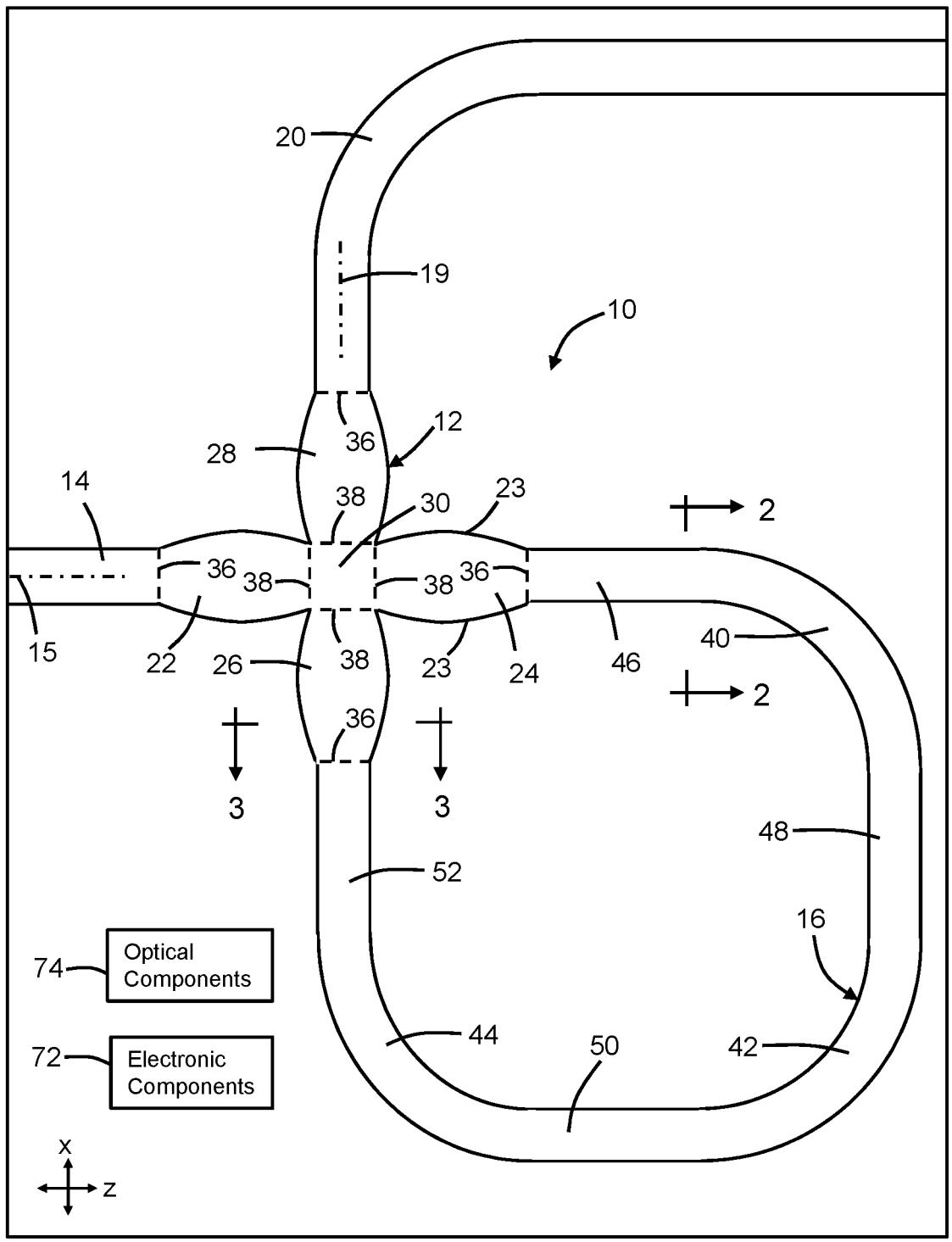
FIG. 1 is a diagrammatic top view of a structure at an initial fabrication stage of a processing method in accordance with embodiments of the invention.
Figure 2:
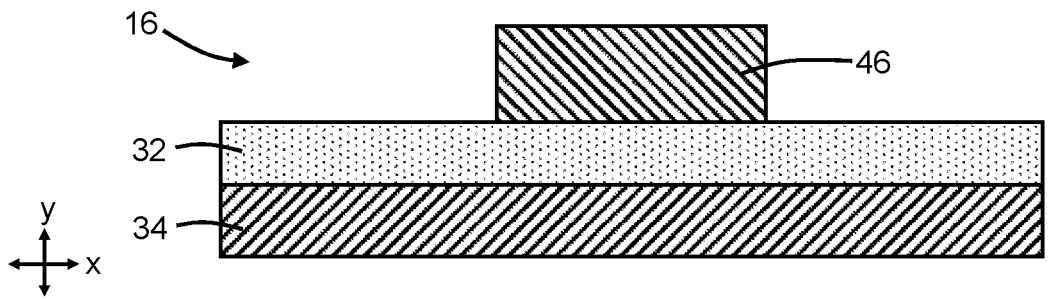
FIG. 2 is a cross-sectional view taken generally along line 2-2 in FIG. 1.
Figure 3:
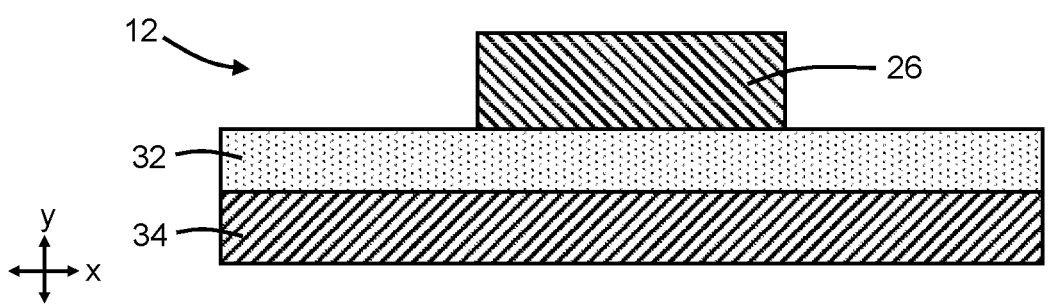
FIG. 3 is a cross-sectional view taken generally along line 3-3 in FIG. 1.

With reference to FIGS. 1, 2, 3 and in accordance with embodiments of the invention, a structure 10 includes a waveguide crossing 12 having arms 22, 24, 26, 28, a waveguide core 14 coupled to the arm 22 of the waveguide crossing 12 to provide an input port, a waveguide core 20 coupled to the arm 28 of the waveguide crossing 12, and a waveguide loop 16 having an input port coupled to the arm 24 of the waveguide crossing 12 and an output port coupled to the arm 26 of the waveguide crossing 12. The arms 22, 24 of the waveguide crossing 12 are aligned along a longitudinal axis 15, and the arms 26, 28 of the waveguide crossing 12 are aligned along a longitudinal axis 19 that may be oriented transverse or orthogonal to the longitudinal axis 15. The waveguide crossing 12 includes a central section 30 providing a junction that is arranged between the arms 22, 24 of the waveguide crossing 12, and also arranged between the arms 26, 28 of the waveguide crossing 12. Each of the arms 22, 24, 26, 28 is coupled at one end to a different portion of the central section 30. The waveguide crossing 12, the waveguide cores 14, 20, and the waveguide loop 16 may be planar structures with coplanar top surfaces and coplanar bottom surfaces.

The waveguide crossing 12, the waveguide cores 14, 20, and the waveguide loop 16 may be composed of a single-crystal semiconductor material (e.g., single-crystal silicon). The waveguide crossing 12, the waveguide cores 14, 20, and the waveguide loop 16 may be concurrently formed by patterning a device layer of a silicon-on-insulator (SOI) wafer with lithography and etching processes that form an etch mask over the device layer and etch the masked device layer with an etching process, such as reactive ion etching (ME). The waveguide crossing 12, the waveguide cores 14, 20, and the waveguide loop 16 may be arranged on a buried insulator layer 32 of the SOI wafer. The buried insulator layer 32 may be composed of a dielectric material, such as silicon dioxide, and the buried insulator layer 32 is arranged over a substrate 34 that may contain a single-crystal semiconductor material (e.g., single-crystal silicon). The waveguide crossing 12, the waveguide cores 14, 20, and the waveguide loop 16 may have a ridge construction because the device layer is fully etched during patterning. The buried insulator layer 32 may operate as a lower cladding providing confinement for waveguide crossing 12, the waveguide cores 14, 20, and the waveguide loop 16 of the structure 10.

Each of the arms 22, 24, 26, 28 may have shapes with curvatures that are identical or substantially identical with respect to the central section 30, other than orientation along the respective longitudinal axis 15, 19. Each of the arms 22, 24, 26, 28 includes an interface 38 at one end that is coupled to the central section 30 and an interface 36 located at an opposite end from the interface 38. Each of the arms 22, 24, 26, 28 may be shaped with side surfaces 23 having a curvature defined by a non-linear function. For example, each of the arms 22, 24, 26, 28 may have a shape described by a cosine function in which the width at the interfaces 38 is greater than the width at the interfaces 36. However, the arms 22, 24, 26, 28 may have other shapes, such as a tapered shape or a combination of two or more cascaded tapered shapes.

The arm 24 of the waveguide crossing 12 is coupled to the arm 26 of the waveguide crossing 12 by the waveguide loop 16. The waveguide loop 16 includes waveguide bends 40, 42, 44 and waveguide sections 46, 48, 50, 52 that are arranged and interconnected to provide a direct connection between the arm 24 of the waveguide crossing 12 and the arm 26 of the waveguide crossing 12. The waveguide section 46 may be directly connected to the arm 24 at one of the interfaces 36, and the waveguide bend 40 may be connected to the arm 24 by the waveguide section 46. The waveguide section 46 may be aligned parallel to the longitudinal axis 15. The waveguide section 48 may be directly connected at opposite ends to both of the waveguide bends 40, 42 such that the waveguide bend 40 is connected to the waveguide bend 42 by the waveguide section 48. The waveguide section 48 may be aligned parallel to the longitudinal axis 19. The waveguide section 50 may be directly connected at opposite ends to the waveguide bends 42, 44 such that the waveguide bend 42 is connected to the waveguide bend 44 by the waveguide section 50. The waveguide section 50 may be aligned parallel to the longitudinal axis 15. The waveguide section 52 may be directly connected to the arm 26 at one of the interfaces 36, and the waveguide bend 44 may be connected to the arm 26 by the waveguide section 52. The waveguide section 52 may be aligned parallel to the longitudinal axis 19.

The waveguide bends 40, 42, 44 may each provide the waveguide loop 16 with a 90° change in direction, which defines respective right-angle intersections between the different waveguide sections 46, 48, 50, 52. Collectively, the waveguide bends 40, 42, 44 may provide a 270° change in direction that connects the arm 24 of the waveguide crossing 12 with the arm 26 of the waveguide crossing 12. The waveguide sections 46, 48, 50, 52 may be straight sections that lack curvature. The waveguide section 46 may have a width equal to the width of the arm 24 at the associated interface 36, and the waveguide section 52 may have a width equal to the width of the arm 26 at the associated interface 36.

In use, light may be received at the arm 22 of the waveguide crossing 12. The received light may include both polarization components (e.g., a transverse electric (TE) component and a transverse magnetic (TM) component). The light propagates through the central section 30 to the arm 24 of the waveguide crossing 12 and from the arm 24 to the waveguide loop 16. The light propagates through the waveguide loop 16 to the arm 26 of the waveguide crossing 12 and, during propagation between the arm 24 and the arm 26, one of the mode components (e.g., the TM mode component) may be eliminated. The other mode component (e.g., the TE mode component) of the light is passed by the waveguide loop 16 to the arm 26. The light propagates through the arm 26 and central section 30 to the arm 28 of the waveguide crossing 12 and from the arm 28 to the waveguide core 20.

In alternative embodiments, the waveguide crossing 12, waveguide cores 14, 20, and the waveguide loop 16 may be composed of a different material. In an embodiment, the waveguide crossing 12 may be composed of a dielectric material, such as silicon nitride. The waveguide crossing 12, waveguide cores 14, 20, and the waveguide loop 16 may be formed by depositing a layer of the constituent material, and patterning the deposited layer with lithography and etching processes that form an etch mask over the deposited layer and etch the masked deposited layer with an etching process, such as reactive ion etching (RIE).

Figure 4:
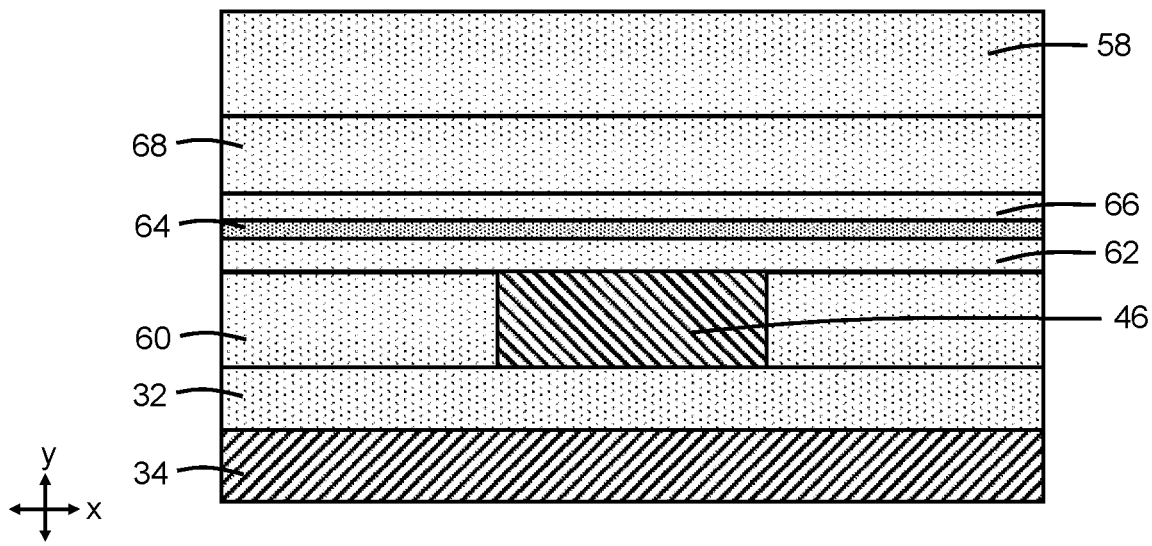
FIGS. 4 and 5 are respective cross-sectional views of the structure at a fabrication stage of the processing method subsequent to the fabrication stage of FIGS. 2 and 3.
Figure 5:
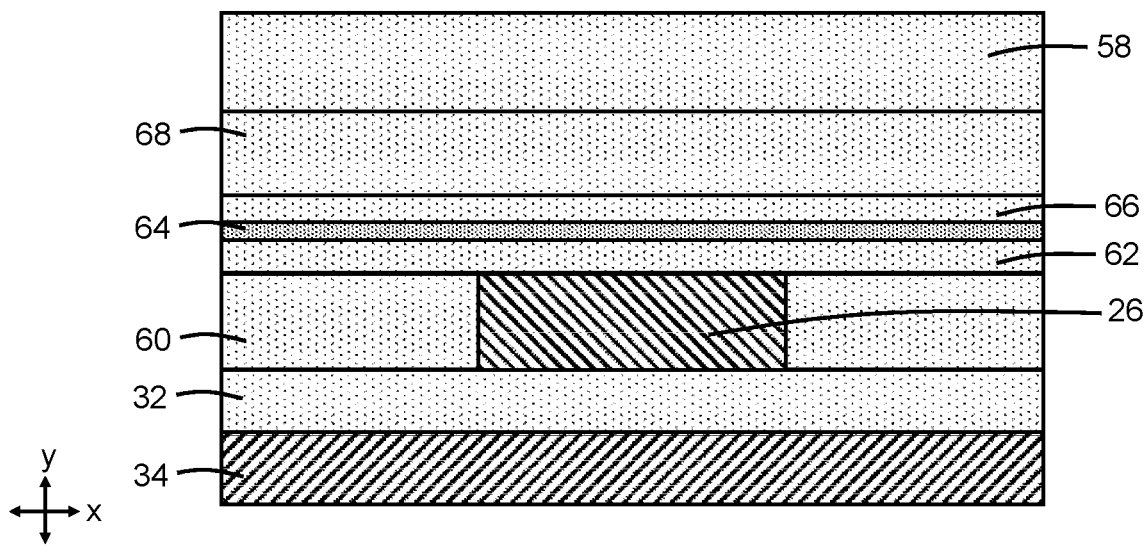

With reference to FIGS. 4, 5 in which like reference numerals refer to like features in FIGS. 2, 3 and at a subsequent fabrication stage, dielectric layers 60, 62, 64, 66 composed of respective dielectric materials are sequentially formed in a layer stack over the waveguide crossing 12, the waveguide cores 14, 20, and waveguide loop 16. In the layer stack, the dielectric layer 60 is arranged over the buried insulator layer 32, the waveguide crossing 12, the waveguide cores 14, 20, and waveguide loop 16, the dielectric layer 62 is arranged over the dielectric layer 60, the dielectric layer 64 is arranged over the dielectric layer 62, and the dielectric layer 66 is arranged over the dielectric layer 64. The waveguide crossing 12, the waveguide cores 14, 20, and waveguide loop 16 are embedded or buried in the dielectric material of the dielectric layers 60, 62, which act as cladding.

The dielectric layer 60 may be composed of a dielectric material, such as silicon dioxide, deposited by chemical vapor deposition and planarized with, for example, chemical mechanical polishing to remove topography. The dielectric layer 62 may be composed of dielectric material, such as silicon dioxide, deposited by chemical vapor deposition or atomic layer deposition over the dielectric layer 60. The dielectric layer 64 may be composed of dielectric material, such as silicon nitride, deposited by chemical vapor deposition or atomic layer deposition over the dielectric layer 62. The dielectric layer 66 may be composed of dielectric material, such as silicon dioxide, deposited by chemical vapor deposition or atomic layer deposition over the dielectric layer 64. The dielectric layers 62, 64, 66 may be planar layers arranged in the layer stack over the planarized top surface of the dielectric layer 60.

A dielectric layer 68 of a contact level is formed by middle-of-line processing over the dielectric layer 66. The dielectric layer 68 may be composed of dielectric material, such as silicon dioxide, deposited by chemical vapor deposition using ozone and tetraethylorthosilicate (TEOS) as reactants.

A back-end-of-line stack, generally indicated by reference numeral 58, is formed by back-end-of-line processing over the dielectric layer 68 and the structure 10. The back-end-of-line stack 58 may include one or more interlayer dielectric layers composed of one or more dielectric materials, such as a carbon-doped silicon oxide, and metallization composed of, for example, copper, tungsten, and/or cobalt that is arranged in the one or more interlayer dielectric layers.

The structure 10, in any of its embodiments described herein, may be integrated into a photonics chip that may include electronic components 72 and additional optical components 74. The electronic components 72 may include, for example, field-effect transistors that are fabricated by CMOS front-end-of-line (FEOL) processing using the device layer of the SOI wafer.

The structure 10 provides a compact polarizer that is capable of eliminating one of the polarizations of light propagating on a photonics chip. Different optical components 74 may have an intended optical performance for a specific polarization such that eliminating the other polarization effectively eliminates a source of noise. The structure 10 may be optimized for the O-band (1260 nm to 1360 nm) and may be optimized for transmitting light with transverse electric (TE) polarization and eliminating light with transverse magnetic (TM) polarization.

Figure 6:
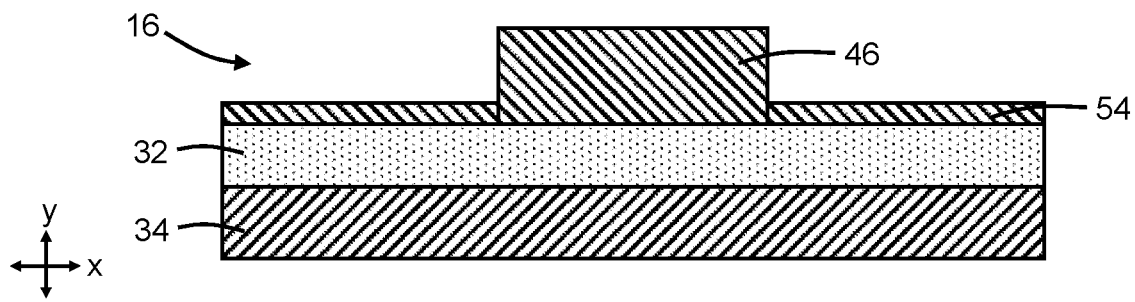
FIGS. 6 and 7 are cross-sectional views of a structure in accordance with alternative embodiments of the invention.
Figure 7:
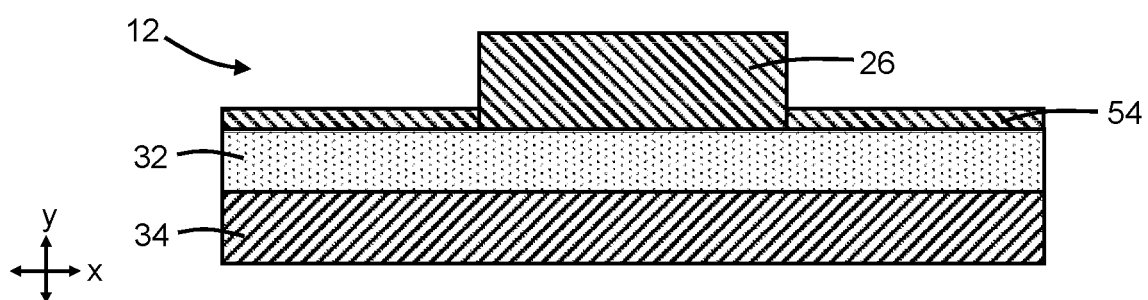

With reference to FIGS. 6, 7 in which like reference numerals refer to like features in FIGS. 2, 3 and in accordance with alternative embodiments of the invention, the device layer may be partially etched during patterning of the waveguide crossing 12, the waveguide cores 14, 20, and the waveguide loop 16 to define a slab layer 54. The slab layer 54, which is in direct contact with the buried insulator layer 32, is coupled to the waveguide crossing 12, the waveguide cores 14, 20, and the waveguide loop 16. The slab layer 54 is thinner than the waveguide crossing 12, the waveguide cores 14, 20, and the waveguide loop 16, which are masked during patterning. The waveguide crossing 12, the waveguide cores 14, 20, and the waveguide loop 16 may have a rib construction due to the addition of the slab layer 54.

Figure 8:
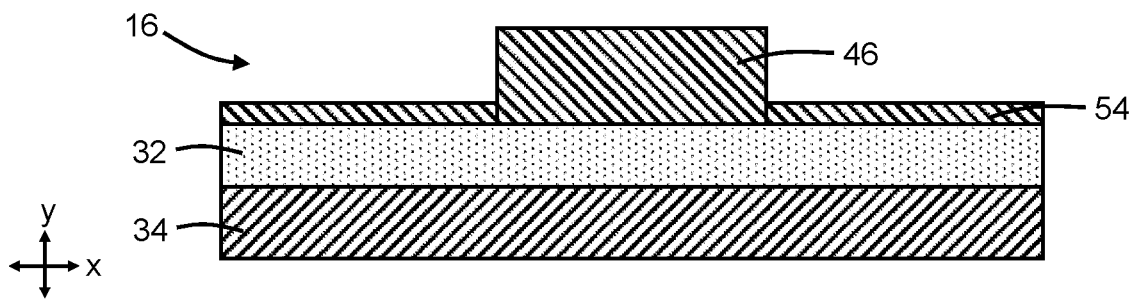
FIGS. 8 and 9 are cross-sectional views of a structure in accordance with alternative embodiments of the invention.
Figure 9:
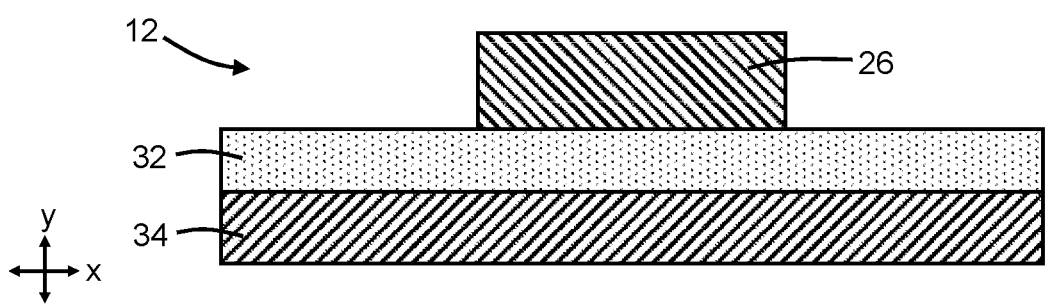

With reference to FIGS. 8, 9 in which like reference numerals refer to like features in FIGS. 6, 7 and in accordance with alternative embodiments of the invention, the device layer may be partially etched during patterning of only the waveguide loop 16 to define the slab layer 54. The waveguide crossing 12 and the waveguide cores 14, 20 may be fully etched during their patterning such that the slab layer 54 is absent. The waveguide crossing 12 and the waveguide cores 14, 20 may have a ridge construction, and the waveguide loop 16 may have a rib construction due to the addition of the slab layer 54.

Figure 10:
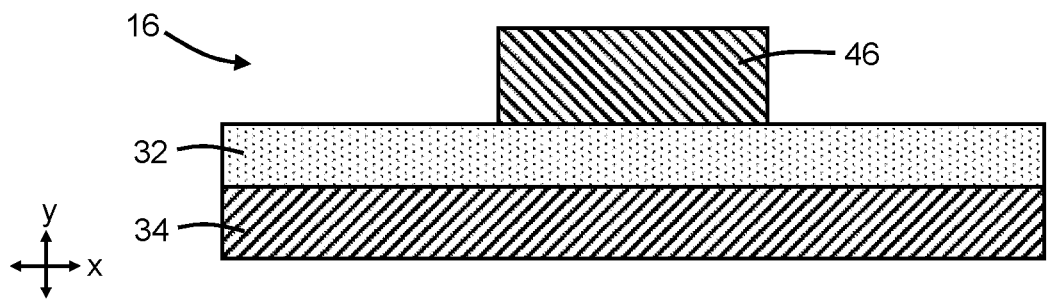
FIGS. 10 and 11 are cross-sectional views of a structure in accordance with alternative embodiments of the invention.
Figure 11:
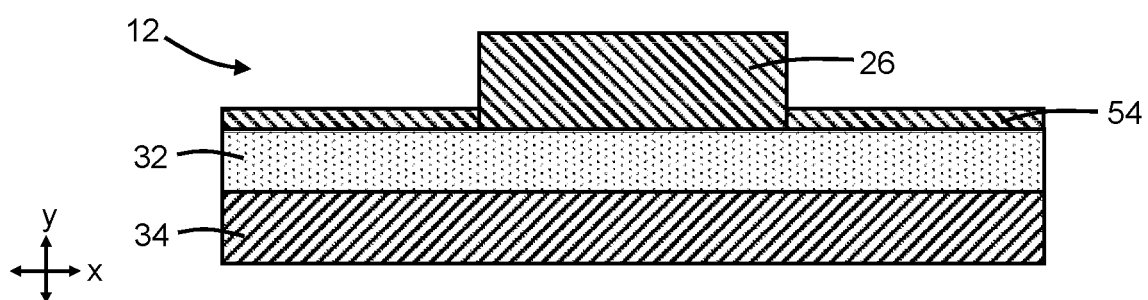

With reference to FIGS. 10, 11 in which like reference numerals refer to like features in FIGS. 6, 7 and in accordance with alternative embodiments of the invention, the device layer may be partially etched during patterning of the waveguide crossing 12 and the waveguide cores 14, 20 to define the slab layer 54. The waveguide loop 16 may be fully etched during their patterning such that the slab layer 54 is absent. The waveguide loop 16 may have a ridge construction, and the waveguide crossing 12 and the waveguide cores 14, 20 may have a rib construction due to the addition of the slab layer 54.

Figure 12:
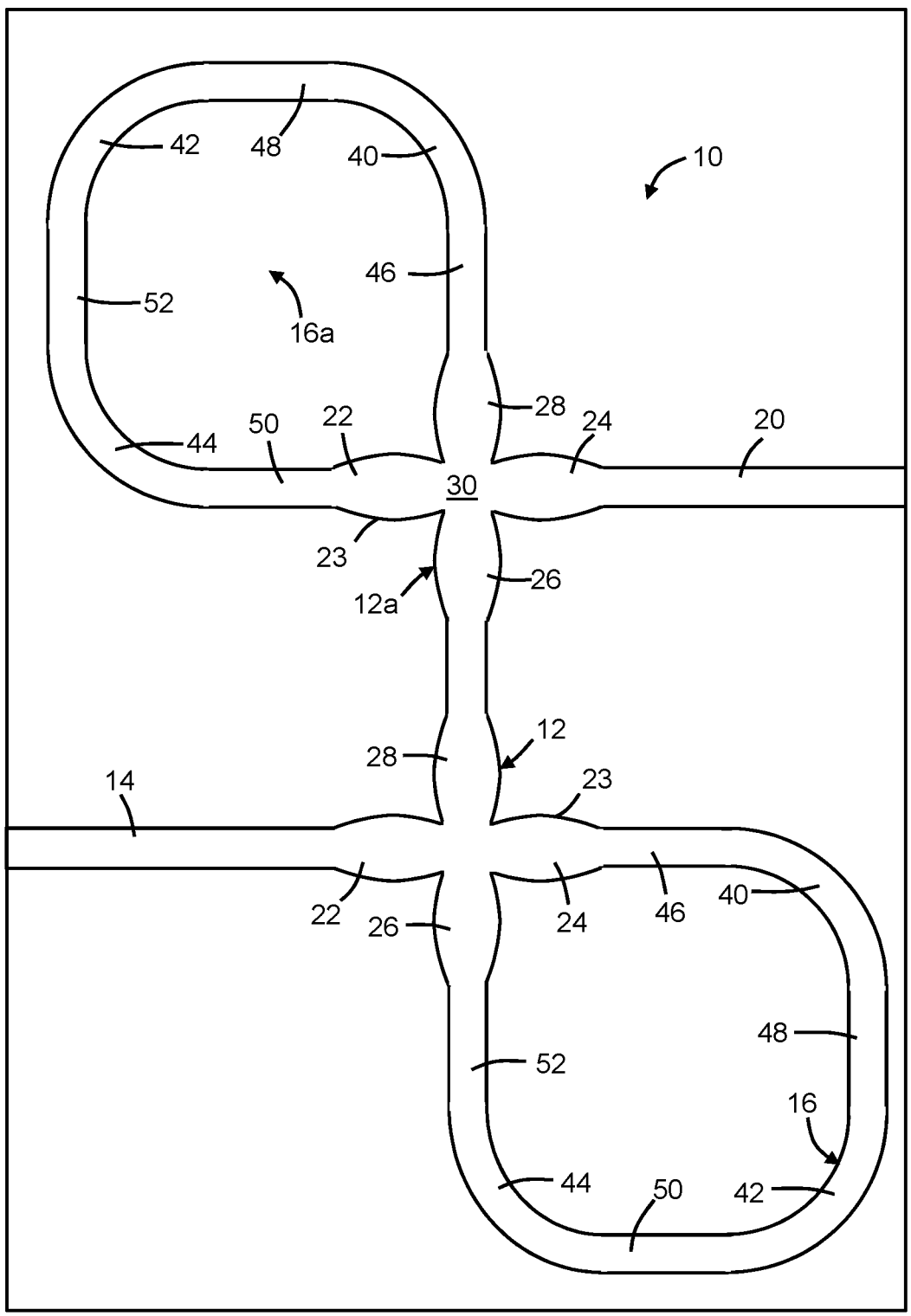
FIG. 12 is a top view of a structure in accordance with alternative embodiments of the invention.

With reference to FIG. 12 and in accordance with alternative embodiments of the invention, the waveguide crossing 12 and the waveguide loop 16 may be duplicated to form a waveguide crossing 12a and a waveguide loop 16a. The arm 28 of the waveguide crossing 12 is coupled to the arm 26 of the waveguide crossing 12a. The arm 28 of the waveguide crossing 12a is coupled to the arm 22 of the waveguide crossing 12a by the waveguide loop 16a of the waveguide crossing 12a. The arm 24 of the waveguide crossing 12a is coupled to the waveguide core 20. The waveguide crossing 12a and the waveguide loop 16a may be formed by patterning concurrently with the formation of the waveguide crossing 12 and the waveguide loop 16 by patterning.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate+/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a polarizer, the structure comprising:
a first waveguide crossing including a first arm, a second arm, and a junction connecting the first arm and the second arm; and
a first waveguide loop having an input port coupled to the first arm of the first waveguide crossing and an output port coupled to the second arm of the first waveguide crossing, the first waveguide loop directly connecting the first arm and the second arm of the first waveguide crossing.

2. The structure of claim 1 wherein the first waveguide crossing includes a third arm and a fourth arm, and further comprising:
a first waveguide core coupled to the third arm of the first waveguide crossing; and
a second waveguide core coupled to the fourth arm of the first waveguide crossing.

3. The structure of claim 2 wherein the first arm and the third arm of the first waveguide crossing are aligned along a first longitudinal axis, and the second arm and the fourth arm of the first waveguide crossing are aligned along a second longitudinal axis.

4. The structure of claim 3 wherein the first longitudinal axis is orthogonal to the second longitudinal axis.

5. The structure of claim 1 wherein the first waveguide loop includes a plurality of waveguide bends.

6. The structure of claim 5 wherein each of the plurality of waveguide bends provides a 90° change of direction.

7. The structure of claim 6 wherein the plurality of waveguide bends collectively provide a 270° change of direction.

8. The structure of claim 1 wherein the first waveguide loop includes a first waveguide bend, a second waveguide bend, and a third waveguide bend, the first waveguide bend provides a 90° change of direction, the second waveguide bend provides a 90° change of direction, and the third waveguide bend provides a 90° change of direction.

9. The structure of claim 8 wherein the first waveguide loop includes a first section coupling the first waveguide bend to the first arm of the waveguide crossing, a second section coupling the second waveguide bend to the first waveguide bend, a third section coupling the second waveguide bend to the third waveguide bend, a fourth section coupling the third waveguide bend to the second arm, and the third section, the second waveguide bend, and the third waveguide bend comprise a same material.

10. The structure of claim 9 wherein the first section, the second section, the third section, and the fourth section are respective straight sections.

11. The structure of claim 10 wherein the first section is aligned parallel to the third section, and the second section is aligned parallel to the fourth section.

12. The structure of claim 1 wherein the first arm and the second arm each have a side surface with a curvature defined by a cosine function.

13. The structure of claim 1 wherein the first waveguide crossing includes a third arm, and further comprising:
 a second waveguide crossing including a first arm, a second arm, and a third arm coupled to the third arm of the first waveguide crossing; and
 a second waveguide loop having an input port coupled to the first arm of the second waveguide crossing and an output port coupled to the second arm of the second waveguide crossing, the second waveguide loop directly connecting the first arm and the second arm of the second waveguide crossing.

14. The structure of claim 13 wherein the first waveguide loop includes a first plurality of waveguide bends, and the second waveguide loop includes a second plurality of waveguide bends.

15. The structure of claim 14 wherein each of the first plurality of waveguide bends provides a 90° change of direction, and each of the second plurality of waveguide bends provides a 90° change of direction.

16. The structure of claim 15 wherein the first plurality of waveguide bends collectively provide a 270° change of direction, and the second plurality of waveguide bends collectively provide a 270° change of direction.

17. A method of forming a structure for a polarizer, the method comprising:
 forming a first waveguide crossing including a first arm, a second arm, and a junction connecting the first arm and the second arm; and
 forming a first waveguide loop having an input port coupled to the first arm of the first waveguide crossing and an output port coupled to the second arm of the first waveguide crossing, wherein the first waveguide loop directly connects the first arm and the second arm of the first waveguide crossing.

18. The method of claim 17 wherein the first waveguide crossing includes a third arm, and further comprising:
 forming a second waveguide crossing including a first arm, a second arm, and a third arm coupled to the third arm of the first waveguide crossing; and
 forming a second waveguide loop coupling the first arm of the second waveguide crossing to the second arm of the second waveguide crossing.

19. The method of claim 17 wherein the first waveguide loop includes a plurality of waveguide bends.

20. The method of claim 19 wherein each of the plurality of waveguide bends provides a 90° change of direction, and the plurality of waveguide bends collectively provide a 270° change of direction.

* * * * *